(12) United States Patent
Huang et al.

(10) Patent No.: US 11,866,337 B2
(45) Date of Patent: Jan. 9, 2024

(54) METHODS FOR SYNTHESIZING GRAPHENE GELS

(71) Applicant: Northwestern University, Evanston, IL (US)

(72) Inventors: Jiaxing Huang, Wilmette, IL (US); Luke Clyde Oak Prestowitz, Evanston, IL (US)

(73) Assignee: Northwestern University, Evanston, IL (US)

( * ) Notice: Subject to any disclaimer, the term of this patent is extended or adjusted under 35 U.S.C. 154(b) by 78 days.

(21) Appl. No.: 17/846,293

(22) Filed: Jun. 22, 2022

(65) Prior Publication Data

US 2023/0002233 A1    Jan. 5, 2023

Related U.S. Application Data

(60) Provisional application No. 63/217,489, filed on Jul. 1, 2021.

(51) Int. Cl.
*C01B 32/198* (2017.01)
*C01B 32/194* (2017.01)
*H01G 11/32* (2013.01)

(52) U.S. Cl.
CPC .......... *C01B 32/198* (2017.08); *C01B 32/194* (2017.08); *C01P 2002/72* (2013.01); *C01P 2004/03* (2013.01); *C01P 2006/40* (2013.01); *H01G 11/32* (2013.01)

(58) Field of Classification Search
CPC .................................................... C01B 32/198
See application file for complete search history.

(56) References Cited

U.S. PATENT DOCUMENTS 10,193,156 B2     1/2019   Yang et al.

FOREIGN PATENT DOCUMENTS

| CN | 105271213 A |   | 1/2016  |             |
|----|-------------|---|---------|-------------|
| CN | 106006620 A |   | 10/2016 |             |
| CN | 107720741 A | * | 2/2018  | C01B 32/184 |

OTHER PUBLICATIONS

J. I. Paredes, S. Villar-Rodil, A. Martínez-Alonso, and J. M. D. Tascón *Langmuir* 2008 24 (19), 10560-10564 DOI: 10.1021/la801744a.
Li, Chun, and Gaoquan Shi. "Functional gels based on chemically modified graphenes." *Advanced materials* 26.24 (2014): 3992-4012.

* cited by examiner

*Primary Examiner* — Khanh T Nguyen
(74) *Attorney, Agent, or Firm* — Bell & Manning, LLC (57) ABSTRACT

Provided are methods for synthesizing a graphene gel. In embodiments, such a method comprises flowing a graphene oxide composition comprising graphene oxide and a solvent, the solvent having a boiling point higher than pure water, through a reaction chamber under conditions to deoxygenate the graphene oxide and induce gelation to form a graphene gel suspended in the solvent and flowing through the reaction chamber.

20 Claims, 6 Drawing Sheets

METHODS FOR SYNTHESIZING GRAPHENE GELS

CROSS-REFERENCE TO RELATED APPLICATIONS

The present application claims priority to U.S. provisional patent application No. 63/217,489 that was filed Jul. 1, 2021, the entire contents of which are incorporated herein by reference.

REFERENCE TO GOVERNMENT RIGHTS

This invention was made with government support under grant number N00014-20-1-2190 awarded by the Office of Naval Research (ONR). The government has certain rights in the invention.

BACKGROUND

Graphene oxide (GO) is the product of chemical exfoliation of graphite powders, which can be obtained as a colloidal dispersion in water with high single-layer yield and large lateral sizes. The insulating GO can be conveniently converted to its conductive form of reduced GO (r-GO, a.k.a., chemical modified graphene) through many thermal, chemical and light-based methods. Therefore, GO has been used as a water processible precursor to create bulk forms of graphene-based materials including fibers, films, foams, gels and densified solids. Among them, densified graphene monoliths or powders, with largely isotropically packed sheets, have been shown to have interesting chemical, mechanical and electrochemical properties. Such isotropic graphene solids are typically made by slow drying of the corresponding graphene hydrogels obtained by hydrothermal treatments of GO dispersion. The network of the sheets in the hydrogel are crumpled and densely packed under capillary compression to yield the final high-density solids.

In the hydrothermal gelation process, GO dispersion of relatively high concentration is heated well over the boiling point of water to trigger the deoxygenation reaction of GO. Since the resulting reduced GO sheets are less dispersible in water, they gradually aggregate and assemble into a network, forming a hydrogel during undisturbed cooling. Since the temperatures typically used to induce the hydrothermal sol-gel transition occurs well above the boiling point of water, a sealed pressurized vessel is needed to contain the reaction, constraining the synthesis to batch processing and making it harder to scale up. Larger reaction vessels do yield larger hydrogels, which, however, are prone to collapse due to its own weight, and non-uniform drying can lead to cracking and inhomogeneous microstructures.

SUMMARY

Provided are methods for synthesizing a graphene gel. In embodiments, such a method comprises flowing a graphene oxide composition comprising graphene oxide and a solvent, the solvent having a boiling point higher than pure water, through a reaction chamber under conditions to deoxygenate the graphene oxide and induce gelation to form a graphene gel suspended in the solvent and flowing through the reaction chamber.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

FIGS. 1A-1D demonstrate the continuous flow synthesis of a graphene gel according to an illustrative embodiment of the present methods. FIG. 1B shows a portion of a reaction chamber (tube) of the system 100. The tube contains a flowing dispersion of graphene oxide (GO) in ethylene glycol (EG). The right-hand portion of the schematic illustrates the process of syneresis during the sol-gel transition (gelation) which allows the forming graphene gel to be levitated or suspended in the EG and glide through the tube without any drag or friction with the tube.

FIGS. 2A-2E relate to graphene gel and xerogel characterization.

DETAILED DESCRIPTION

Provided are methods for synthesizing a graphene gel. In embodiments, such a method comprises flowing a graphene oxide composition comprising graphene oxide (GO) and a solvent through a reaction chamber under conditions to deoxygenate the graphene oxide and induce gelation to form a graphene gel suspended in the solvent. The method may further comprise collecting the graphene gel from the reaction chamber.

The GO of the GO composition is in the form of a plurality of thin, flexible sheets. Each sheet may comprise from one to several (e.g., 3-10) monolayers of GO. Thus, the thickness of the sheets may be less than about 10 nm, less than about 5 nm, less than about 1 nm, or in the range of from a monolayer to about 10 nm or a monolayer to about 1 nm. The lateral dimensions of the sheets are not particularly limited, but generally are significantly greater than the thickness, e.g., on the order of microns, e.g., 1 µm, 10 µm, 50 µm, 100 µm, providing an aspect ratio of at least >1000. Known methods may be used to form the GO, e.g., chemical exfoliation of a graphite powder followed by mechanical exfoliation. Commercial sources of GO may be used. The sheets are generally dispersed throughout the GO composition such that the GO composition may be considered to be a colloidal dispersion of the GO in the solvent.

The solvent of the GO composition is a liquid other than water, the liquid capable of forming the colloidal dispersion noted above. The solvent is also a liquid having a relatively high boiling point, e.g., higher than the boiling point of pure water (100° C.). The boiling point of the solvent may be higher than a reaction temperature being used in the method to achieve the deoxygenation and gelation. The boiling point may be at least 150° C., at least 160° C., at least 170° C., at least 180° C., at least 190° C., or in a range of from 150° C. to 250° C. The solvent is generally an organic compound, e.g., an alcohol. The solvent may be a glycol, e.g., ethylene glycol (EG).

The GO composition may include other components. In embodiments, the GO composition comprises a $CO_2$ sequestrant, a chemical compound capable of reacting with $CO_2$ in the GO composition as the $CO_2$ is released during the deoxygenation of the GO. In embodiments, the $CO_2$ sequestrant is a base, e.g., NaOH, which reacts with released $CO_2$ to form $Na_2CO_3$. The GO composition may include an additional liquid, e.g., water. The GO composition may include an additive such as a polymer (e.g., polyaniline nanofibers), a carbon-based material (e.g., carbon black, carbon nanotubes, etc.), particles (or nanoparticles) of silicon or metal or an oxide thereof, biomass. Any additive may be used in order to tune the properties of the synthesized graphene gel.

Various amounts of the GO, the solvent, the $CO_2$ sequestrant, the additional liquid, and the additive may be used. For example, the GO may be present in the GO composition at a concentration in a range of from 0.1 mg/mL to 25 mg/mL, from 0.5 mg/mL to 10 mg/mL, or from 1 mg/mL to 10 mg/mL. Amounts of the $CO_2$ sequestrant may be used so as to control $CO_2$ bubble formation and to facilitate continuous, rather than broken/interrupted, synthesis of the graphene gel as described in the Example, below. The additional liquid may be used in an amount of from 1 volume % to 10 volume % (as compared to the total volume of the GO composition). This includes from 2 volume % to 8 volume % and from 3 volume % to 6 volume %. The additive may be used at a concentration within the ranges described above for the GO. The balance of the GO composition is generally the solvent. Other illustrative amounts of the components of the GO composition are provided in the Example, below.

In embodiments, the GO composition consists of the GO, the solvent (e.g., ethylene glycol), the $CO_2$ sequestrant (e.g., NaOH), optionally, the additional liquid (e.g., water), and optionally, the additive (e.g., one or more of polyaniline nanofibers, carbon black, nickel particles). In embodiments, the GO composition consists of the GO, the solvent, the $CO_2$ sequestrant, the additional liquid, and optionally, the additive. In any of the embodiments of the GO composition described herein, a single type of each component (solvent, $CO_2$ sequestrant, additional liquid, and additive) may be used or multiple, different types of each component may be used.

Figure 1A:
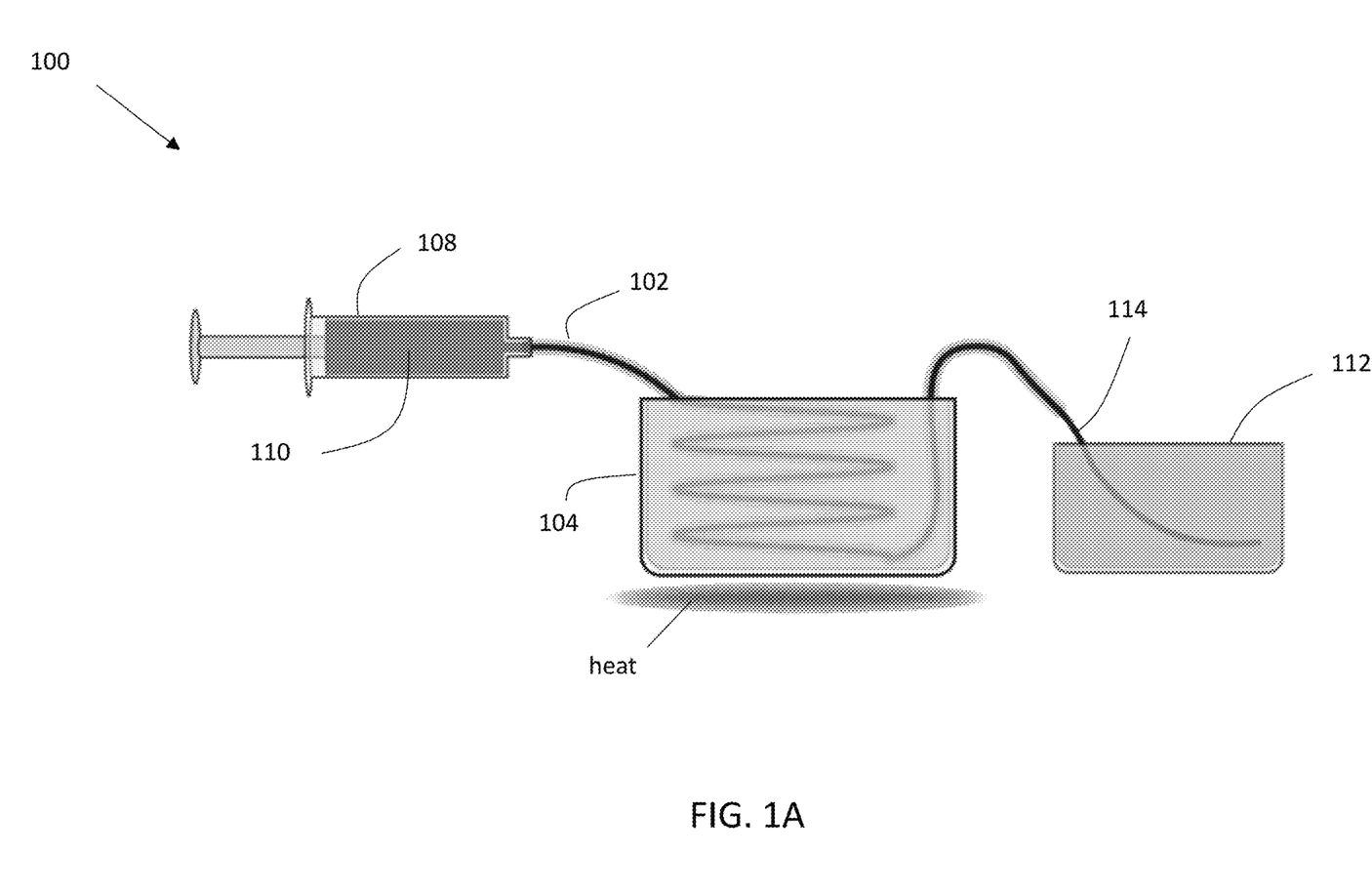
FIG. 1A shows a schematic of an illustrative system 100 that may be used to carry out the present methods.

As noted above, the present methods are carried out by flowing the GO composition through the reaction chamber. Any reactor system configured to deliver the GO composition as a flowing stream and to collect the graphene gel formed in the flowing stream may be used. Such a reactor system may be referred to as a "continuous flow reactor system." Continuous flow reactor systems are distinguished from batch reactor systems. An illustrative continuous flow reactor system 100 is shown in FIG. 1A. The system 100 includes a reaction chamber, which, in this embodiment, is a tube 102. A portion of the tube 102 is immersed in a heat bath 104 so as to achieve a desired reaction temperature. The system 100 also includes a syringe 108 configured to flow a GO composition 110 through the tube 102. In this embodiment, the syringe 108 also functions as the source of the GO composition 110. The system 100 further includes a chamber 112 configured to collect the graphene gel 114 as it is being synthesized. In this embodiment, the chamber 112 is filled with liquid (e.g., water) for rinsing and solvent exchange. Other components may be used in the system 100, e.g., a furnace rather than a heat bath. Other components may be included in the system 100, e.g., a mechanical pump, additional sources to introduce additives into the flowing stream. However, a notable feature of the system 100 is that the reaction chamber (the tube 102) is not a pressurized reaction chamber, i.e., the method is carried out under atmospheric pressure. (This does not preclude some amount of pressure on the GO composition from the syringe pump.)

Figure 1B:
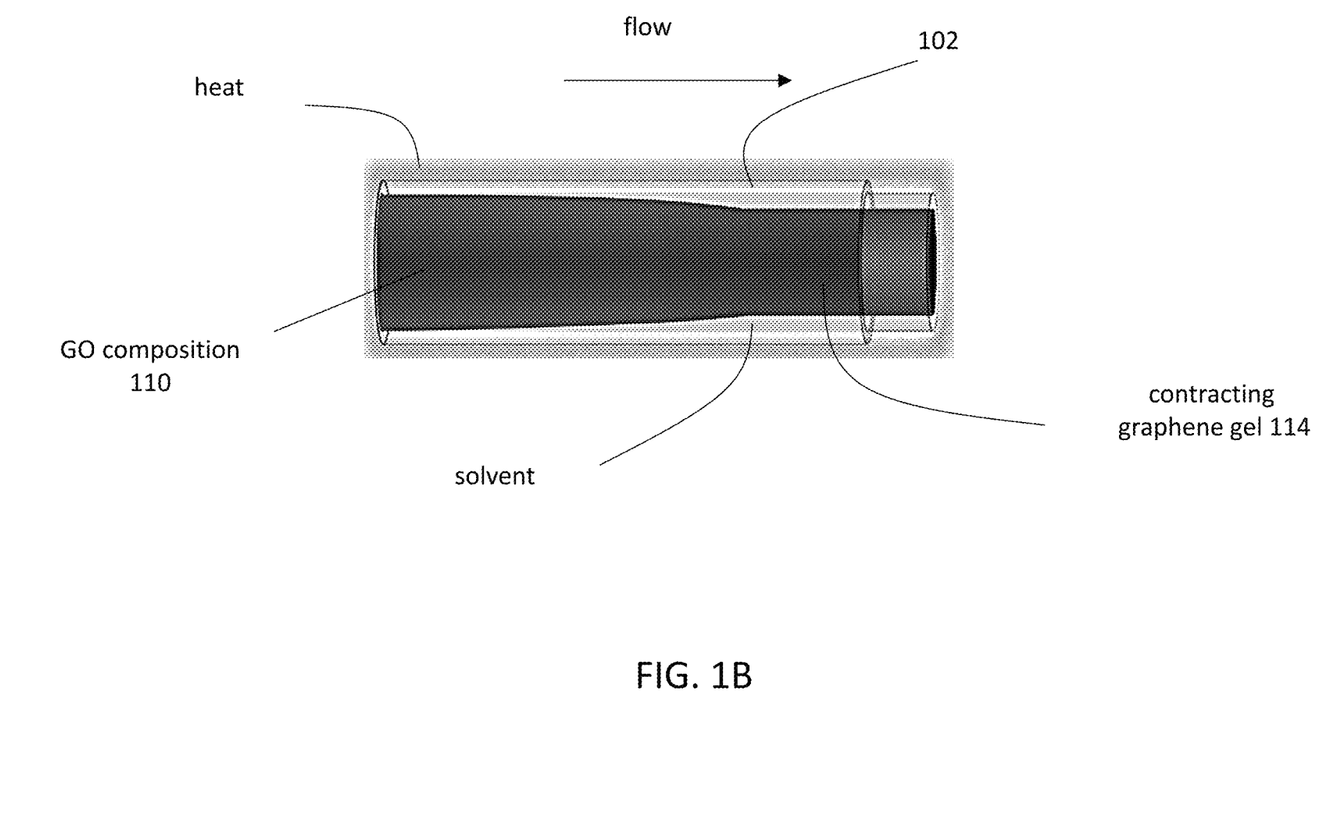

By "conditions," as that term is used with respect to the present methods, can refer to the flow rate of the GO composition (which affects the reaction time), the dimensions of the reaction chamber (e.g., the inner diameter and length of the tube 102 of the reaction chamber (which also affects the reaction time)), and the reaction temperature. These conditions are generally adjusted to facilitate the deoxygenation of the GO and gelation. Deoxygenation refers to the removal of at least some of the oxygen-containing groups in the GO (e.g., hydroxyl groups, epoxy groups, carboxyl groups, carbonyl groups, carboxylic groups, or combinations thereof). In the present methods, these deoxygenation reactions are induced by heat, rather than by using chemical reductants (although in embodiments, chemical reductants may be used). Gelation refers to the aggregation and assembly of the deoxygenated GO sheets to form a non-fluid network suspended in the solvent. This "non-fluid network" of deoxygenated GO sheets is the synthesized graphene gel. This process is illustrated in FIG. 1B. FIG. 1B shows a portion of the tube 102 immersed in the heat bath 104 through which the GO composition 110 is being flowed. As the GO composition 110 is flowed through the tube 102, heat from the heat bath 104 induces deoxygenation of the GO and gelation to form the graphene gel 114. Syneresis accompanies the gelation so that the graphene gel 114 contracts from inner surfaces of the tube 102 to become suspended therein. This suspension allows the graphene gel to also be flowed through the reaction chamber and ultimately, to be collected therefrom.

As noted above, the conditions are generally adjusted to facilitate the GO deoxygenation and gelation. Illustrative flow rates of the GO composition include those in the range of from 10 mL/hr to 100 mL/hr, from 20 mL/hr to 80 mL/hr, and from 30 mL/hr to 60 mL/hr. Illustrative tube inner diameters include those in the range of from 2 mm to 15 mm, from 3 mm to 14 mm, and from 3 mm to 10 mm. Illustrative tube lengths include those in the range of from 0.5 m to 10 m, from 1 m to 10 m, and from 1 m to 5 m. Illustrative reaction times (which depend upon flow rate and tube dimensions) include those in the range of from 1 minute to about 120 minutes, from 10 minutes to 80 minutes, and from 20 minutes to 60 minutes. Illustrative reaction temperatures include those in a range of from 120° C. to 300° C., from 130° C. to 250° C., from 140° C. to 200° C. As noted above, a feature of the present methods that the deoxygenation and gelation do not require pressurized conditions (i.e., pressure greater than atmospheric pressure). In other words, the conditions under which the present methods may be carried out include the use of atmospheric pressure. (As noted above, this does not preclude some amount of pressure on the GO composition from pumping the GO composition through the reaction chamber.)

As shown in FIG. 1A, collection of the synthesized graphene gel may involve expulsion or extrusion of the graphene gel from the reaction chamber into a suitable container. Expelled solvent/other components of the GO composition may also be collected as part of this step. Solvent exchange and/or rinsing may be carried out on the collected graphene gel, as further described in the Example below. As also shown in FIG. 1A, the graphene gel generally has a shape corresponding to the interior shape of the reaction chamber in which it was synthesized (in this embodiment, the graphene gel is in the form of an elongated, flexible rope). The dimensions of the graphene gel are also similar (but generally smaller due to syneresis) to the interior dimensions of the reaction chamber.

The present methods may further comprise removing solvent (or other liquid) from the graphene gel. The removed solvent/liquid may be that which was used in the GO composition and/or that which was used in a subsequent solvent exchange/rinsing step. Solvent removal may be carried out in air at room temperature (or an elevated temperature) for a period of time. Solvent removal may be carried out using freeze-drying. As described in the Example, below, these two different solvent removal processes impart the dried graphene gel with different structural characteristics. (See FIGS. 3A-3E.) The dried graphene gel may be referred to herein as a "xerogel" or an "aerogel."

Dried graphene gels (i.e., xerogels or aerogels) may be subjected to further processing such as grinding, purification, annealing, etc., as described in the Example, below. Dried graphene gels may be used in a variety of applications, including, but not limited to electrodes, electrolytes, and/or catalysts in devices such as supercapacitors, batteries, fuel cells, and solar cells.

As noted above, the present methods involve the deoxygenation of GO to remove at least some oxygen-containing groups. Thus, the graphene gel will be characterized by a higher carbon-to-oxygen ratio than the GO from which the graphene gel is derived. However, the deoxygenation need not be complete. The graphene gel may be characterized by a carbon-to-oxygen ratio of, e.g., at least 2, at least 2.5, at least 3.

Example

Introduction

Hydrothermal treatment of graphene oxide (GO) aqueous dispersions has been used to create graphene (a.k.a., reduced GO) hydrogels, which dry to yield high density graphene monoliths and powders for use in electrochemical energy storage applications. This Example demonstrates an alternative glycol-thermal route that allows the preparation of a graphene gel at around 150° C., which is below the boiling point of ethylene glycol and eliminates the need for a sealed pressurized reaction vessel. In the present methods, flow synthesis can be achieved by flowing a GO dispersion in ethylene glycol through a Teflon tube immersed in a preheated oil bath for continuous production of a graphene gel, which, upon drying, shrinks to yield a densified graphene solid.

Experimental Methods

Low temperature hydrogel formation: 80 ml of a 0.1 wt. % GO solution was placed in a 100 ml beaker. The beaker was then placed in an oven at 98° C. and a plastic cover was placed on top. It was left for 24 hours, after which a hydrogel had formed.

Synthesis of glycol-gel in a vial: A GO dispersion of 2 mg ml$^{-1}$ in ethylene glycol was prepared, which contained 4-5% of water. 18 ml of this dispersion was added into a glass scintillation vial, which was suspended in a silicon oil bath heated to 150° C. No stirring was applied. Time lapse photos were taken during the gelation process.

Continuous flow synthesis: Optimized syntheses used a 6 mg ml$^{-1}$ of GO dispersion in ethylene glycol containing 4% of water, to which 0.1 M NaOH was added immediately before extrusion. This solution was then collected in a 60 ml syringe, which was attached to a polytetrafluoroethylene (PTFE) tube 3.2 mm in diameter. The tube was coiled 3 times for a total length of approximately 1.25 m and placed in a silicon oil bath set to 150° C. The solution was pumped through the tube using a syringe pump set to a rate of 45 ml hr$^{-1}$, which corresponds to a linear flow rate of ~568 cm h$^{-1}$ and an overall traveling time of about 22 minutes through the entire heated length of the tube. The extruded gel was collected in a 2 L glass beaker filled with DI water. To purge the remaining reduced graphene oxide gel in the tube after the syringe had been emptied, a new syringe filled with pure ethylene glycol was placed into the pump.

Solvent exchange: The 2 L beaker in which the glycol-gel had been extruded was let to sit in an oven at 60° C. for 4 hours before replenishing water. This cycle was usually repeated 4 times over a two-day period. After the final rinse, the gel dried at room temperature to generate a xerogel. This xerogel was then be ground into powders.

Sulfuric acid soak: To accelerate the removal of excess sodium carbonate salt, the xerogel powders were soaked in concentrated sulfuric acid in an oven at 60° C. overnight, followed by rinsing with by DI water before filtration and drying.

Supercapacitor assembly and testing: The purified xerogel powder was then mixed with a 10:1:1 ratio by mass of xerogel powder, Super P, and PTFE binder, respectively. They were all mixed in a mortar and pestle and transferred to a PTFE slab where the mixture was rolled out into single film. Once the film was dried, it was transferred to a nickel foam electrode and pressed at 1 MPa. The electrode was then placed with a symmetric pair in a coin cell and a fine pore filter paper was used as a separation membrane. To this, 6 M KOH electrolyte was added, and the coin cell was pressed at 1 MPa.

The coin cell was then placed in NEWARE battery cell tester, where it was run at 0.1 A/g, 0.3 A/g, 0.5 A/g, 1 A/g, back to 0.1 A/g for 10 cycles each. The capacitance was calculated using the following formula:

$$C_s = \frac{2I\Delta t}{m\Delta V}$$

where $C_s$, is the specific capacitance of the electrode, I the discharge current, $\Delta t$ the discharge time in seconds, m (g) the mass of the electrode, and $\Delta V$ the potential window of the discharge process after the IR drop.

Elemental analysis: Samples were shipped to Atlantic Microlab in Norcross, GA for elemental analysis.

X-ray diffraction: The xerogel powders and the uniaxially compressed r-GO foam were placed on a zero-diffraction plate, and the diffraction pattern was collected on a Rigaku Smartlab X-ray diffractometer using a monochromatic Cu $K_\alpha$ 1,2 (no Cu $k_\beta$) source at 45 kV and 160 mA.

Polyaniline nanofiber co-extrusion: Doped polyaniline nanofibers were mixed into the EG/GO solution at 0.5 mg ml$^{-1}$ using bath sonication for 15 minutes. This solution was then used under the continuous flow synthesis procedure.

Carbon black (CB) co-extrusion: Alfa Aesar Carbon black, Super P Conductive, 99+% (metals basis) [1333-86-4] was added at a mass ratio of 10:1 GO:CB into the EG/GO solution prior to extrusion. It was then mixed using bath sonication for 15 minutes. This solution was then used under the continuous flow synthesis procedure.

Nickel powder co-extrusion: 1 mg ml$^{-1}$ Nickel powder, 3 μm, 99.7% trace metals basis powder from Sigma-Aldrich [7440-02-0] was added into the EG/GO solution prior to extrusion. It was then mixed using bath sonication for 15 minutes. This mixture was then used under the continuous flow synthesis procedure.

Results and Discussion

Hydrothermal gelation of GO involves use of a high-pressure autoclave, in which the GO solution forms a gel which shrinks as the reaction progresses. The gel can be directly dried to form compact and densified graphenic solid. To make clear that high pressure is not essential to the formation of a gel, a GO/water solution (1 mg ml$^{-1}$) was heated at 98° C. with a plastic cap covering the container, loosely, to avoid complete evaporation of water. A soft gel indeed formed successfully after 24 hours, demonstrating that, in fact, high pressure is not needed for gel formation. However, the resulting gel was very brittle and weak, making subsequent handling and processing difficult suggesting that a high temperature, rather than high pressure, facilitates obtaining a stiff gel within a short time frame. Therefore, experiments were conducted using ethylene glycol (EG) as a solvent for formation of a graphene gel at ambient pressure.

First, it was tested whether a graphene gel could be produced in EG. A 20 ml scintillation vial filled with 0.1 wt. % GO/EG solution was placed into a pre-heated silicon oil bath (150° C.), to allow for direct visual observation throughout the solvothermal process. Gelation indeed occurred and was accompanied by syneresis, leading to the suspension of a slightly shrunken gel in the expelled solvent. In the experiment, the vial was intentionally uncapped, demonstrating that high pressure was not necessary for gel formation.

Next, a flow synthesis scheme was designed to form a graphene gel. The system 100 used is shown in FIG. 1A and has been described above. Since the sol-gel transition is accompanied by a drastic increase of viscosity, it was initially expected that flow synthesis of gel in a tube may not be possible. It was initially expected that the drag on the gel by the inner wall of the tube would not only increase the resistance but also continuously deform and damage the gel. However, surprisingly, the graphene glycol-gel underwent sufficient syneresis so that the gel remained levitated/suspended and was able to flow drag-free inside the tube, akin to a hyperloop-train inside a tunnel. A schematic of this levitation/suspension is shown in FIG. 1B. This levitation/suspension allowed for the continuous and smooth extrusion of a graphene gel without getting stuck by friction within the tube. A polytetrafluoroethylene (PTFE) tube was used as the reaction chamber due to its thermal and chemical stability, as well as low surface energy. Depending on the inner diameter of the tube being used for the continuous flow synthesis, graphene gels having different diameters were formed from tubes having inner diameters in a range from 3.2 to 12.7 mm. The following discussion, however, refers to gels having a diameter of 3.2 mm.

Figure 1C:
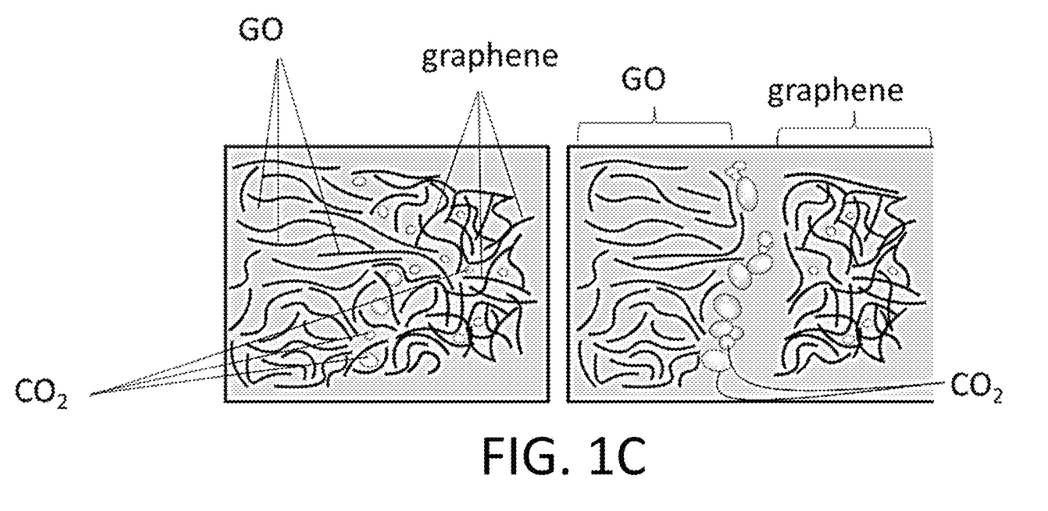
FIG. 1C shows a schematic of the sol-gel process (gelation) occurring in the tube of the system 100 in which $CO_2$ bubbles are released during formation of reduced GO (graphene) from GO. The $CO_2$ bubbles can rapidly expand when they are heated inside the tube, causing uncontrolled bursts which push the solution out of the tube prematurely, before it has a chance to form a continuous, unbroken gel.
Figure 1D:
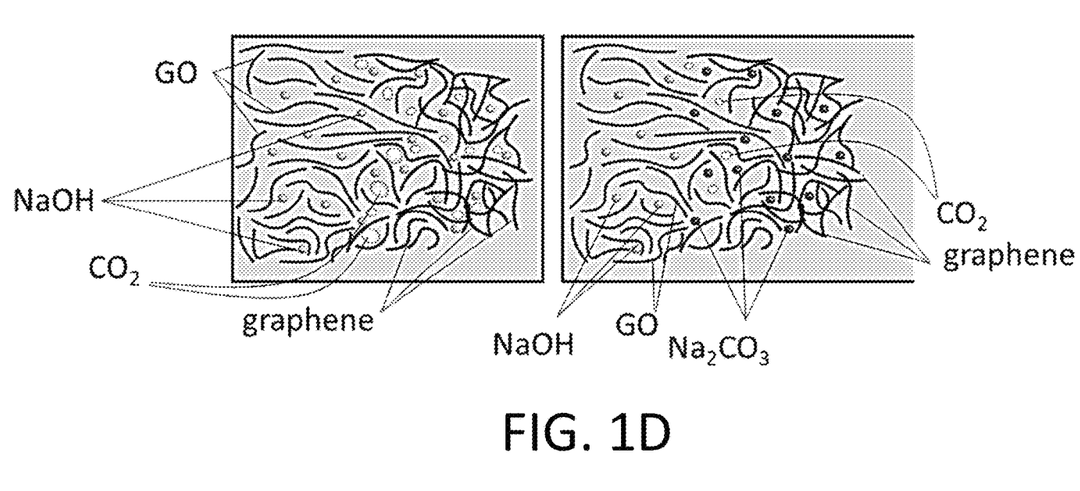
FIG. 1D shows the process in which NaOH has been added to sequestrate $CO_2$ gas by forming $Na_2CO_3$, allowing uninterrupted gelation of graphene that can be extruded continuously.

Referring back to FIGS. 1A-1D, a 6 mg ml$^{-1}$ GO/EG solution was injected into a PTFE tubing at a rate of 45 ml hr$^{-1}$ controlled by a syringe pump (FIG. 1A). The coiled tubing was completely submerged into a silicon oil heating bath maintained at 150° C., resulting in a residence time of the GO of approximately 22 minutes. Thermal deoxygenation of GO and gelation of the sheets happened quickly, with the color changing from brown to black. However, along with the formation of the gel, the generated gas grew into large bubbles at the sol-gel transition interface. These bubbles eventually coalesced to bisect the tube, breaking the glycol-gel from the GO solution. Once the gel was separated, the pressure from the trapped gas pocket rapidly ejected the as-formed glycol-gel out of the tube (FIG. 1C). The gaseous byproducts had insufficient solubility in the solvent. To address this issue, the continuous extrusion of gels can be achieved by sequestrating carbon dioxide, which is the major component of the released gas, using sodium hydroxide to neutralize and convert any generated carbon dioxide to sodium carbonate (FIG. 1D). The salt, together with the ethylene glycol, can be removed by a solvent exchange process with DI water. The solvent exchange was repeated four times over a forty-eight-hour period.

Figure 2A:
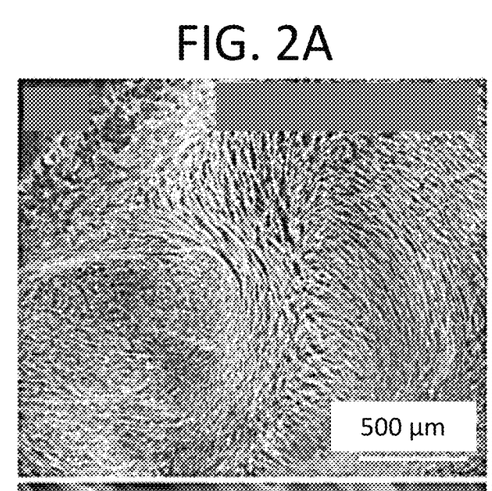
FIG. 2A shows a cross-sectional scanning electron microscope (SEM) image of the as-extruded graphene glycogel showing its low density foam-like structure. The SEM image of FIG. 2B shows that after uniaxial compression from the freeze-drying process, the dried graphene gel turns into a dense anisotropic lammellar structure.
Figure 2B:
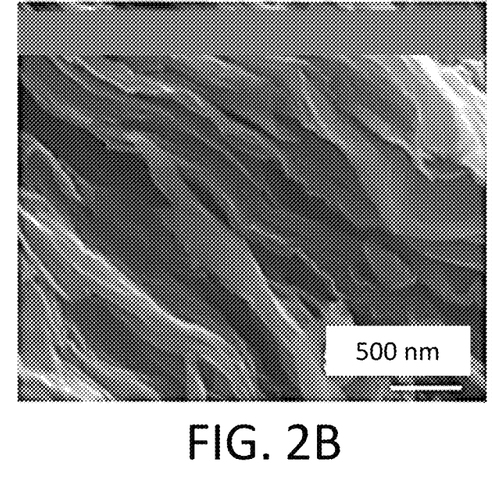
Figure 2C:
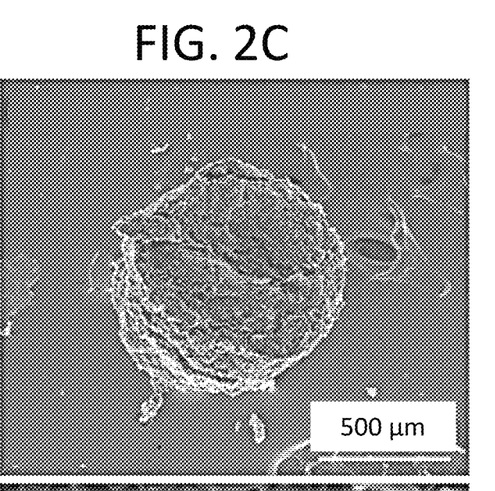
As shown in FIG. 2C, when the graphene gel is dried under ambient conditions (in air), it undergoes isotropic compression which results in the xerogel structure being significantly crumpled and twisted as shown in FIG. 2D.
Figure 2D:
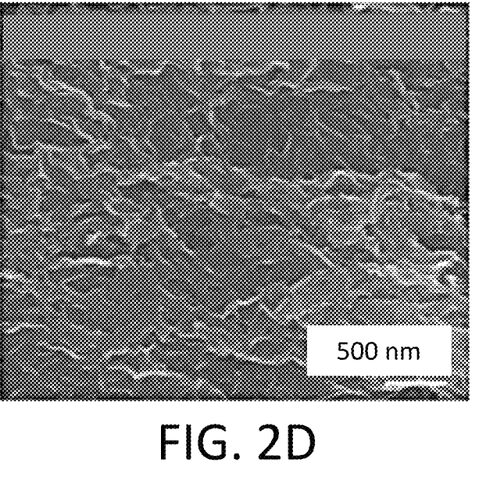
Figure 2E:
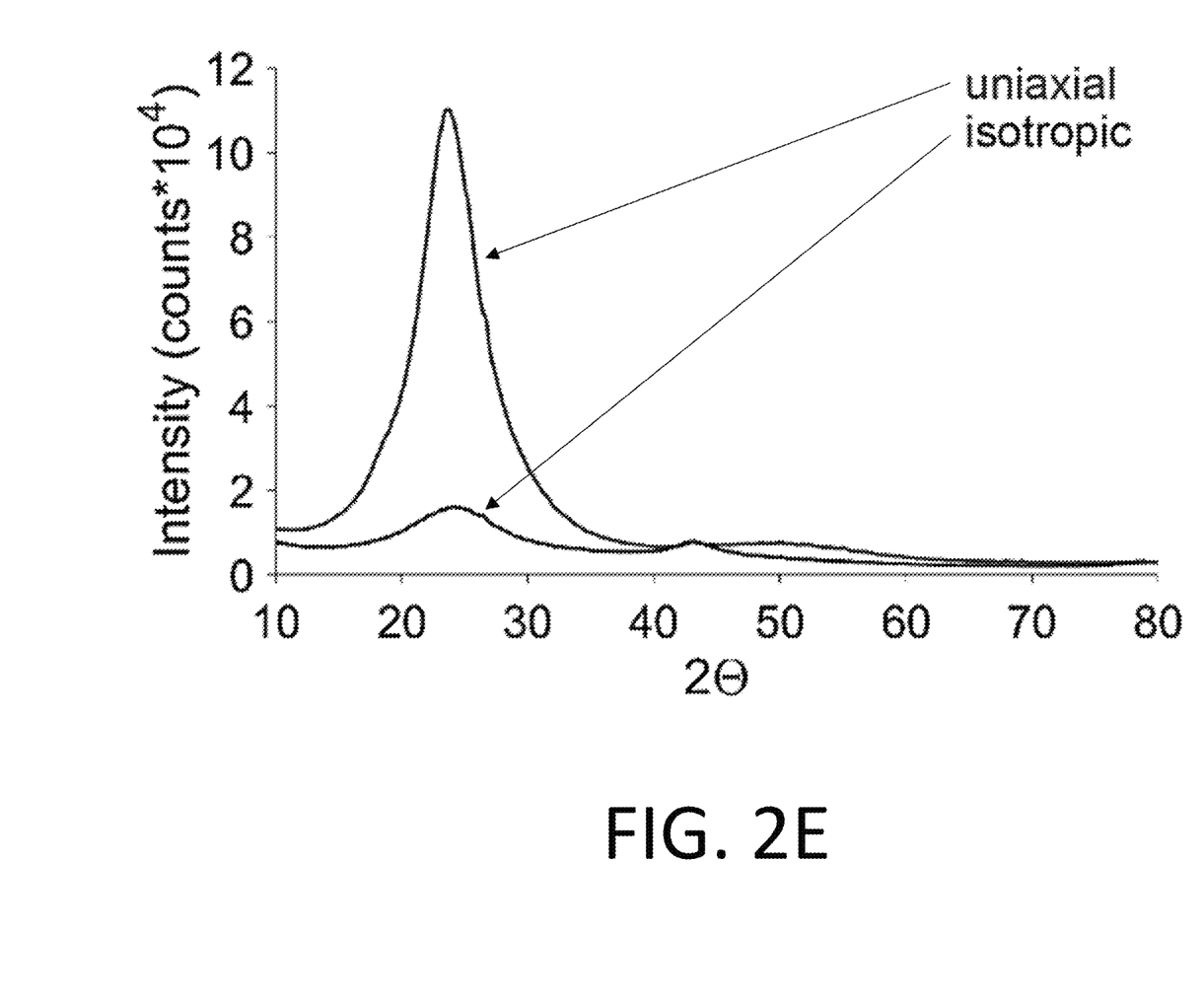
FIG. 2E shows the X-ray diffraction patterns for the freeze-dried xerogel (uniaxial) and the air-dried xerogel (isotropic).

The obtained graphene gels can be dried by freeze-drying to maintain microstructure, or by air drying to yield a densified xerogel after solvent exchange with water. As shown in the cross-sectional scanning electron microscope (SEM) image of FIG. 2A, the as-extruded graphene gel showed a low-density foam structure. Freeze-drying resulted in densification by uniaxial compression, yielding a dense solid with anisotropic lamellar microstructure (FIG. 2B). Slow drying of the graphene gel in air subjected the sheets to a largely isotropic compressive force field, and the resulting microstructure of the xerogel was made of densely yet disorderedly packed crumpled sheets (FIGS. 2C-2D). FIG. 2E shows the X-ray diffraction patterns of the uniaxially compressed, freeze-dried xerogel and the isotropically compressed, air dried xerogel. The lack of long-range stacking order in the air-dried graphene xerogel was confirmed by the significantly weaker (002) peak as compared to the freeze-dried xerogel. The XRD patterns of the air dried xerogel indicates that the xerogel may be used as a building block for making larger bulk graphenic materials.

As noted above, a substantial amount of the by-products in the graphene gels may be removed by solvent exchange; however, some sodium carbonate may remain. Purification can be accelerated by soaking the xerogel in concentrated sulfuric acid overnight. Concentrated sulfuric acid, which is used in the synthesis of GO, intercalates the tightly packed graphene sheets and swells the xerogel, removing the excess sodium carbonate at the same time. However, extended solvent exchange with DI water can also achieve a high purity of the xerogel. After a thorough dilution and rinse, the purified xerogel can be dried at room temperature to achieve a density of 1.63±0.08 g cm$^{-3}$.

Figure 3A:
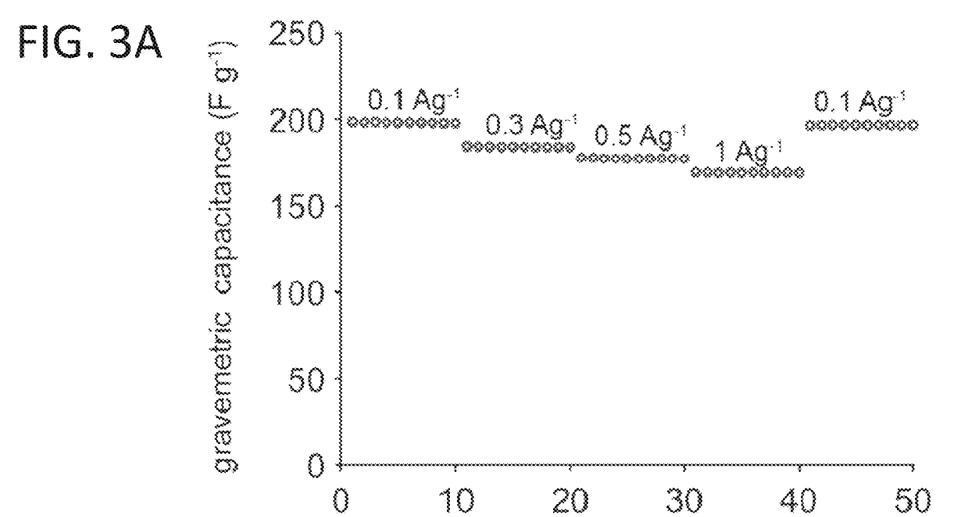
FIGS. 3A and 3B show the electrochemical performance of a graphene xerogel in a coin cell supercapacitor, including gravimetric performance (FIG. 3A) and volumetric performance (FIG. 3B).
Figure 3B:
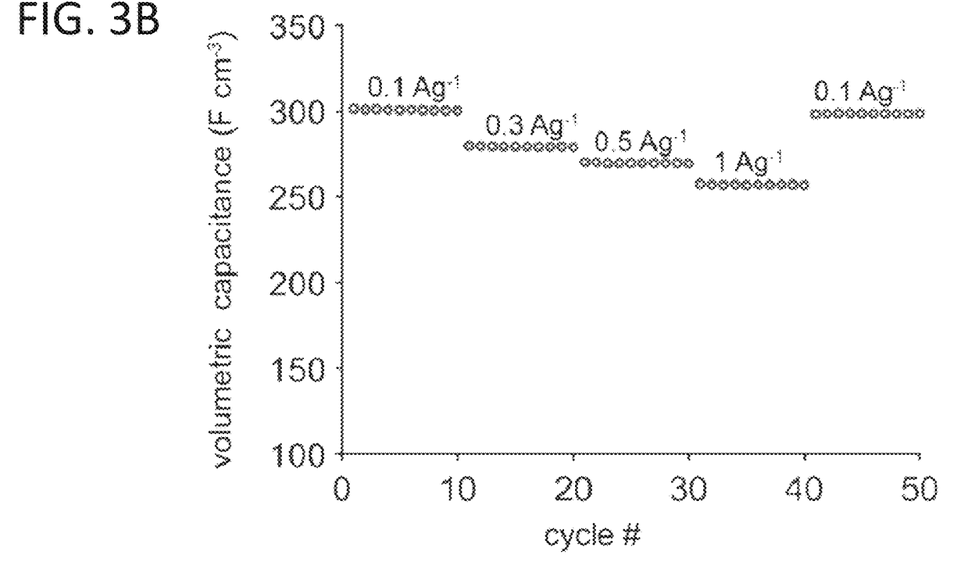

The chemical composition (including carbon, hydrogen, oxygen, and nitrogen) of the xerogel powder before and after purification was evaluated by combustion-based elemental analysis. The sulfur content was found to be negligible, indicating thorough removal of sulfuric acid by the final rinsing step. The atom ratio of carbon to oxygen was approximately 2.8, indicating that the GO was not highly reduced during extrusion. This may be attributed to the short time spent in the heated silicon oil bath. However, despite the low reduction, experiments showed that the xerogel still performed well as an electrode material for supercapacitors. If it was further annealed (e.g., at 350° C. for 1 hour), the conductivity of the xerogel powder was further improved (from 34 Sm$^{-1}$ to 49 Sm$^{-1}$), contributing to an enhancement in performance. As demonstrated in FIG. 3A, the annealed xerogel powder exhibited a gravimetric capacitance of 198 F g$^{-1}$ at a current density of 0.1 A g$^{-1}$, and maintained a respectable value at higher current densities. Based on the xerogel powder's density of 1.52±0.07 g cm$^{-3}$, the volumetric capacitance was estimated to be around 300 F cm$^{-3}$ (see FIG. 3B). The gravimetric and volumetric capacitances are comparable to hydrothermal graphene hydrogels, showing that densified graphene powders may be used as materials for developing supercapacitors with a high energy density. In addition, the quasi-rectangular cyclic voltammetry curves and electrochemical impedance spectroscopy obtained showed good capacitive behavior and low resistance of the graphene xerogel powders.

CONCLUSION AND OUTLOOK

The shrinkage of the graphene gel during glycol-thermal treatment simultaneously expelled excess solvent and suspended the gel. This enabled a flow synthesis of graphene glycol-gels using high boiling point solvents such as EG without the need to seal and pressurize the reaction vessel. Syneresis during the sol-gel transition of GO in a heated tube reactor allowed continuous extrusion of graphene glycol-gel product. Sodium hydroxide can be added to the dispersion to neutralize and capture released $CO_2$ in the reaction. After solvent exchange to replace EG and remove the salt byproducts, the graphene gel was dried in air to yield densified xerogel, which was made of densely and yet disorderly packed crumpled sheets. This flow synthesis method may be extended to prepare a number of GO-based multifunctional composite materials, leveraging GO's surfactant-like properties to co-disperse other materials such as carbon nanomaterials, conductive polymers, biomass, silicon, metal and oxide nanoparticles, and many others. This was shown in other experiments involving addition of polyaniline nanofibers, nickel, and carbon black (separately) in the GO/EG dispersion followed by extrusion. The xerogel powders may be used for electrochemical energy storage applications or as a building block for making larger bulk graphenic glass materials.

Additional information may be found in U.S. Ser. No. 63/217,489, which is hereby incorporated by reference in its entirety.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method of synthesizing a graphene gel, the method comprising:
    flowing a graphene oxide composition comprising graphene oxide and a solvent, the solvent having a boiling point higher than pure water, through a reaction chamber under conditions to deoxygenate the graphene oxide and induce gelation to form a graphene gel suspended in the solvent and flowing through the reaction chamber.

2. The method of claim 1, wherein the boiling point is higher than a reaction temperature being used during flowing to deoxygenate the graphene oxide and induce gelation.

3. The method of claim 1, wherein the boiling point is greater than 150° C.

4. The method of claim 1, wherein the solvent is an alcohol.

5. The method of claim 1, wherein the solvent is a glycol.

6. The method of claim 1, wherein the solvent is ethylene glycol.

7. The method of claim 1, wherein the graphene oxide composition further comprises a $CO_2$ sequestrant.

8. The method of claim 7, wherein the $CO_2$ sequestrant is a base that reacts with $CO_2$ to form a salt.

9. The method of claim 7, wherein the $CO_2$ sequestrant is NaOH.

10. The method of claim 1, wherein the graphene oxide composition further comprises water at an amount of less than 10 volume %.

11. The method of claim 1, wherein the graphene oxide composition consists of the graphene oxide, the solvent, a $CO_2$ sequestrant, water, and optionally, an additive.

12. The method of claim 11, wherein the additive is selected from a polymer, a carbon-based material, silicon or metal or metal oxide particles, or a combination thereof.

13. The method of claim 11, wherein the graphene oxide composition consists of the graphene oxide, the solvent, a $CO_2$ sequestrant, and water.

14. The method of claim 11, wherein the solvent is ethylene glycol and the $CO_2$ sequestrant is NaOH.

15. The method of claim 1, wherein the reaction chamber is a flexible tube.

16. The method of claim 15, wherein the graphene gel is in the form of an elongated, flexible rope.

17. The method of claim 1, wherein the conditions comprise atmospheric pressure.

18. The method of claim 1, wherein the conditions comprise a reaction temperature of at least 150° C. and atmospheric pressure.

19. The method of claim 1, further comprising removing solvent from the graphene gel to form a dried graphene gel.

20. The method of claim 1, wherein the graphene gel is characterized by a carbon-to-oxygen ratio of at least 2.

* * * * *